Feb. 23, 1954 J. D. MOONEY 2,669,971
HYDRAULIC REVERSING TRANSMISSION
Filed May 18, 1949 4 Sheets-Sheet 2

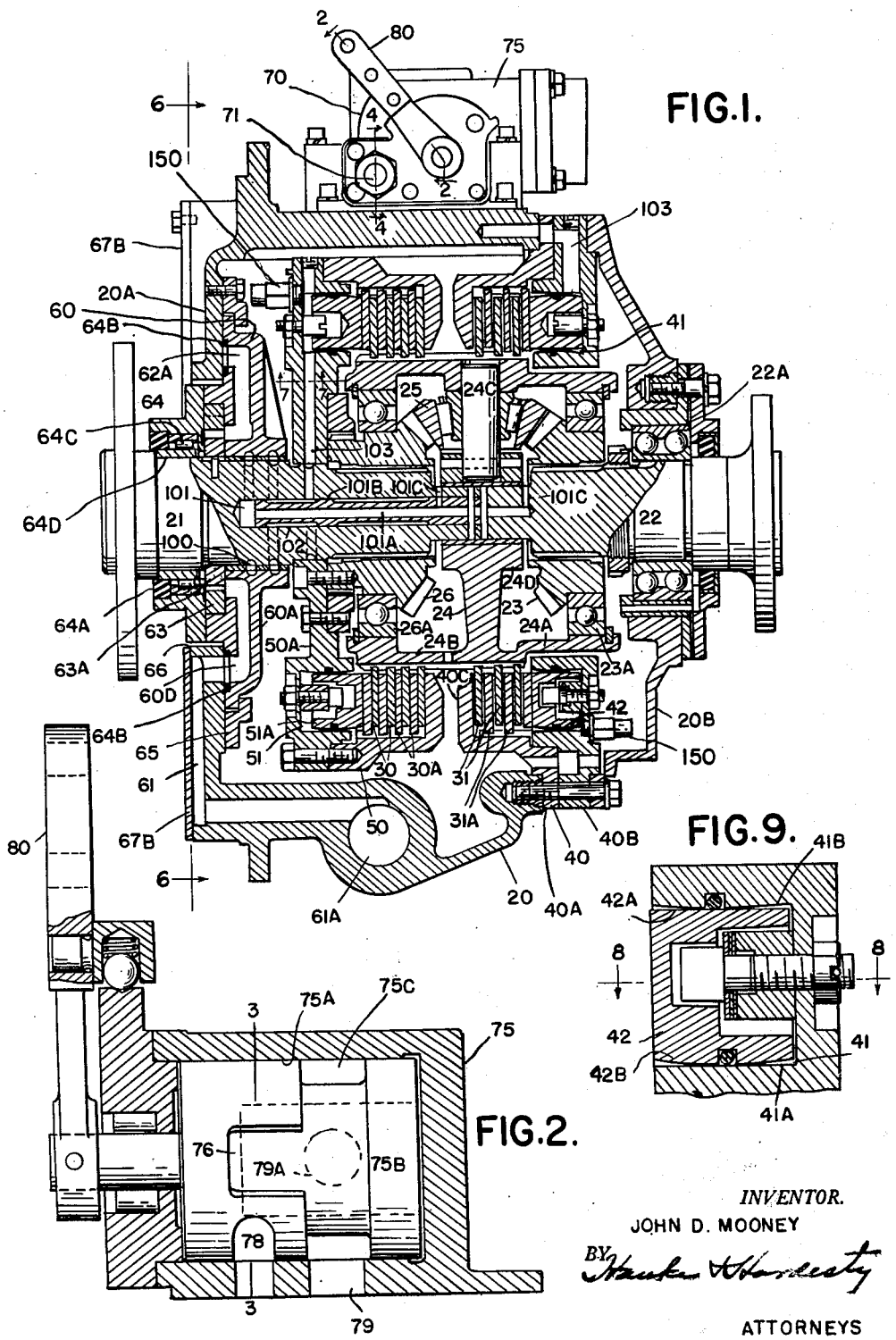

*INVENTOR.*
JOHN D. MOONEY

BY Hauke & Hardesty

ATTORNEYS

Feb. 23, 1954   J. D. MOONEY   2,669,971
HYDRAULIC REVERSING TRANSMISSION
Filed May 18, 1949   4 Sheets-Sheet 3

INVENTOR.
JOHN D. MOONEY
BY
ATTORNEYS

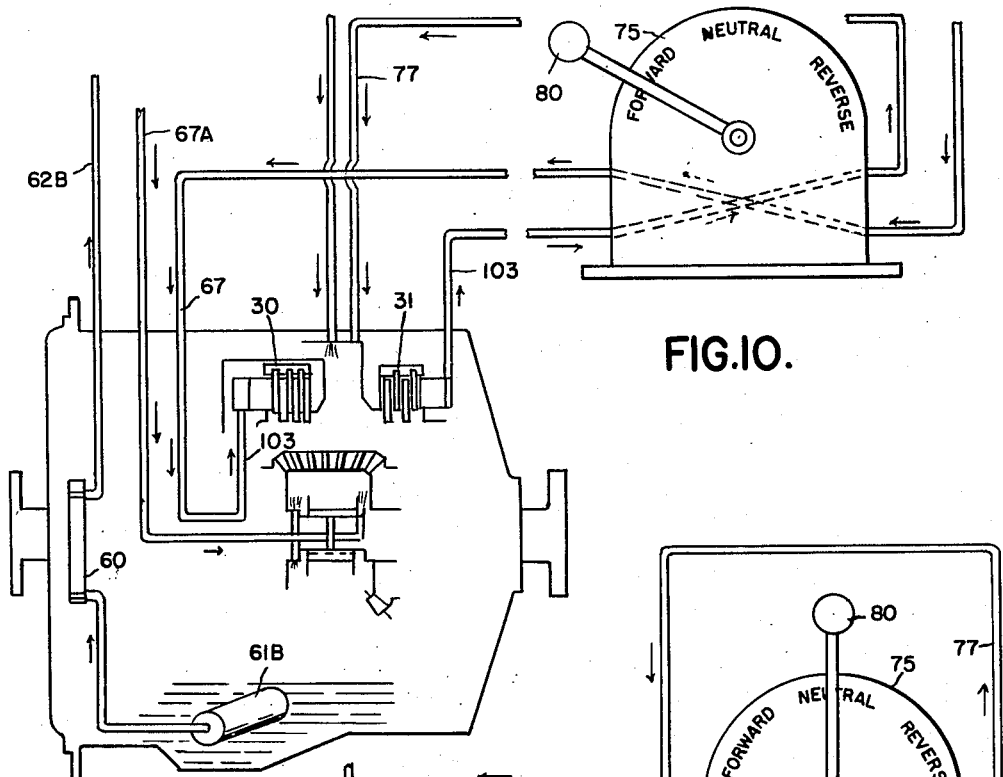
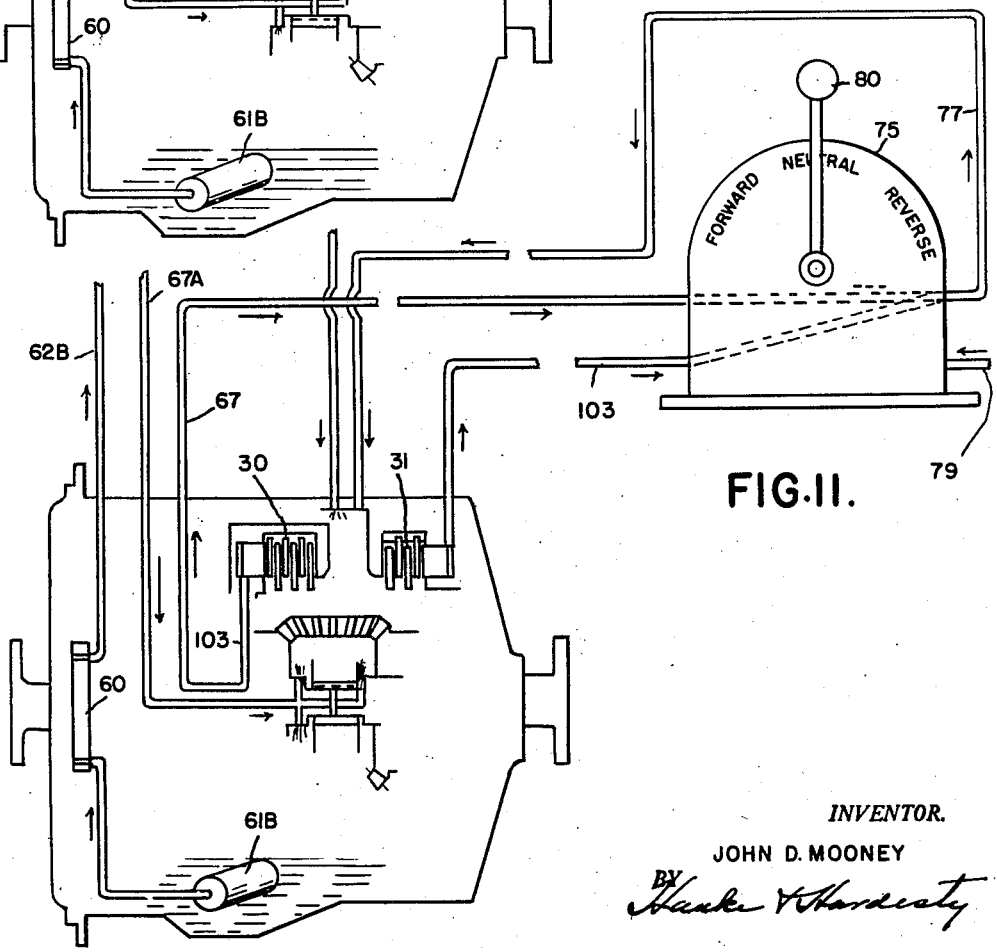

Patented Feb. 23, 1954

2,669,971

UNITED STATES PATENT OFFICE 2,669,971

HYDRAULIC REVERSING TRANSMISSION

John D. Mooney, St. Paul, Minn.

Application May 18, 1949, Serial No. 93,945

3 Claims. (Cl. 121—38)

The present invention relates to hydraulic reversing transmission mechanism for marine power plants.

Among the objects of the invention is to provide a smoothly acting reliable reverse mechanism that will be positive in its action, simple in construction and operation, and one which will be economical to produce.

A further object is to provide oil pressure producing means for the operation of said mechanism so constructed and mounted that it automatically compensates for any misalignment of the drive shaft due to wear or other reason.

Further objects will readily occur to those skilled in the art upon reference to the following description and the accompanying drawings in which—

Fig. 1 is a vertical central longitudinal sectional view of the transmission.

Fig. 2 is a section of the control valve therefor on line 2—2 of Fig. 1.

Fig. 9 is an enlarged section of a cylinder and piston.

Figs. 10, 11 and 12 show diagrammatically the operation of the transmission, showing respectively the "forward," "neutral" and "reverse" positions of the parts.

Figure 3:
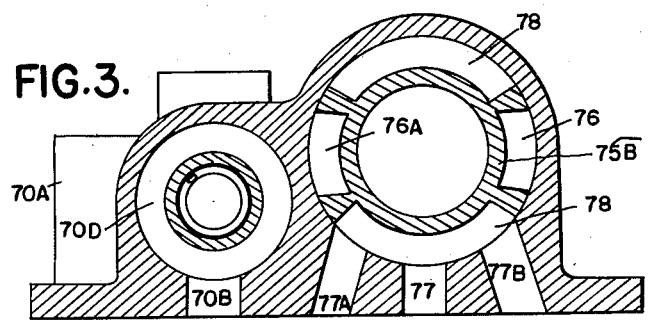
Fig. 3 is a section on line 3—3 of Fig. 2.

Referring to the drawings, the transmission is seen to comprise a housing 20 having at one end an integral end wall 20A and closed at the other end by a cover member 20B with an intermediate member 40, to be described in detail later.

Extending through the end wall 20A is a flanged stub shaft 21, the flange of which is to be bolted to a suitable drive shaft (not shown) which may be and preferably is the crankshaft of the engine (not shown). Mounted in the cover plate 20B is a second flanged stub shaft 22 adapted to be bolted by means of its flange to the propeller shaft (not shown). The two stub shafts 21 and 22 are in axial alignment and their reduced inner ends closely approach each other near the central portion of the housing.

As shown, the driven shaft 22 is mounted in the cover plate 20B in suitable antifriction bearings 22A, and has splined on its inner end a bevel gear 23 mounted in the ball bearing 23A carried in an axial extension 24A of a spider 24 which spider carries a plurality of bevel gears 25 adapted to mesh with the gear 23.

Also adapted to mesh with gears 25 is another bevel gear 26 splined to the inner end of the driving stub shaft 21. The gear 26 is rotatably mounted in the bearing 26A in an axial extension 24B of spider 24. The several gears 25, only one of which is shown, are rotatably mounted on radial pins 24C. The hub 24D of the spider is rotatably carried on the reduced ends of the shafts 21 and 22.

This gearing arrangement is similar to a conventional differential gearing and will be so called hereinafter.

The outer cylindrical face of spider 24 is provided with splines upon which are carried the plates 30 and 31 of a pair of clutches, their intervening and cooperating clutch plates being numbered 30A and 31A respectively.

Interposed betwen cover plate 20B and the housing 20 is a ring shaped member 40 consisting of two rings 40A and 40B, the first of which consists of an internally splined ring carrying on its splines the clutch plates 31A. The other ring 40B includes an annular cylinder 41 open toward the clutch plates and opposite thereto. In the cylinder 41 is an annular piston 42 adapted to be moved outwardly of the cylinder against the clutch plates 31 and 31A and clamp these together between itself and the flange 40C of ring 40A. The rings 40A and 40B are as shown fixed against rotation.

The plates 30 and 30A are, as shown, splined on spider 24 and within a ring member 50 respectively, the latter being similar in form to ring 40A but fixed to the periphery of a disc 50A. In the outer plates 30 and 30A is an annular cylinder 51 within which is mounted an annular piston 51A in position to act upon the plates 30—30A to clamp them together between itself and the flange of ring 50. The disc 50A is carried on shaft 21 and is fixed to the gear 26.

Figure 5:
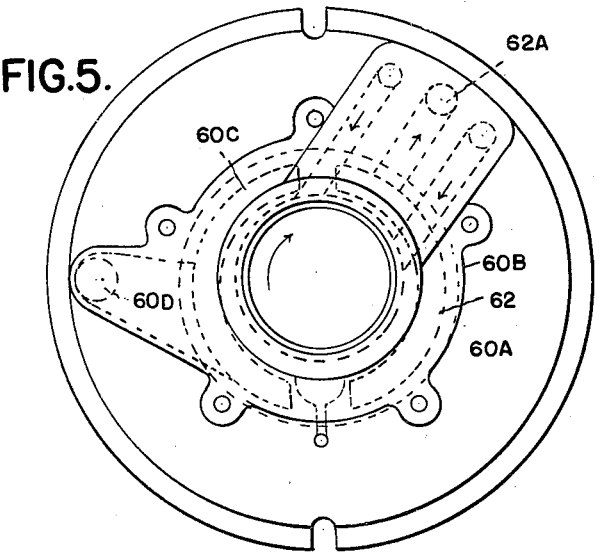
Fig. 5 is a view in elevation of the pump assembly looking toward the left as of Fig. 1.
Figure 12:
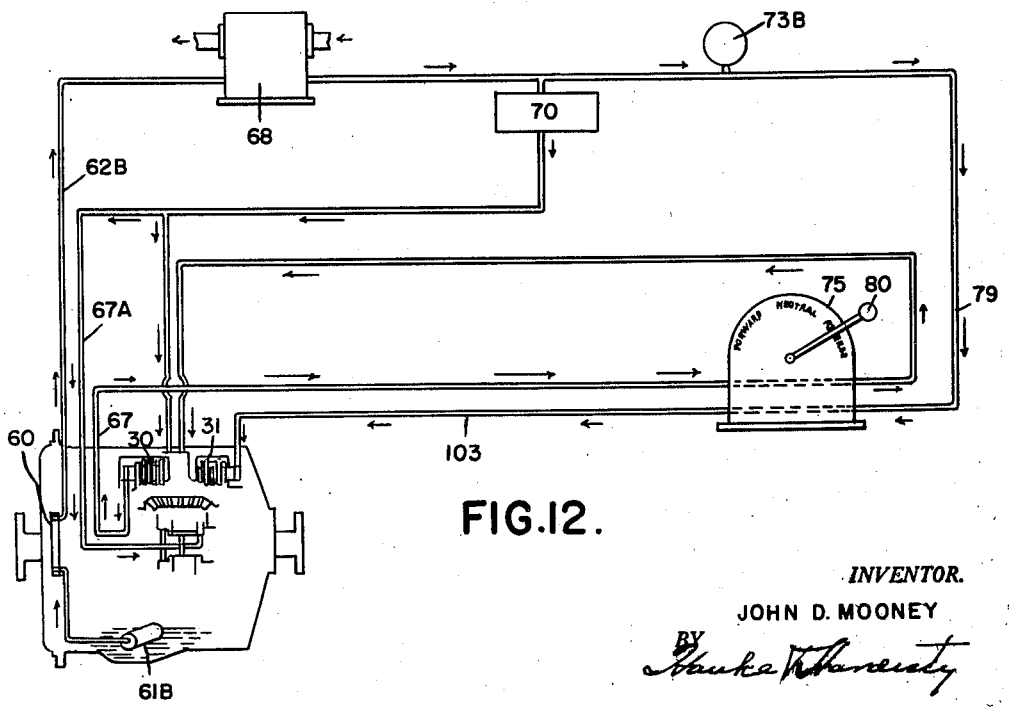

Between the end wall 20A and the disc 50A is located a pump assembly designated as a whole by the numeral 60. This consists of a plate 60A, shown more in detail in Fig. 5, having an annular boss 60B within which are formed an inlet chamber 60C communicating with an inlet passage 60D which in turn is open to the conduit 61 leading from the filter chamber 61A in the bottom of housing 20. Chamber 61A contains the screen indicated at 61B in Figs. 10, 11 and 12. Boss 60B also contains an outlet chamber 62 which is open to a discharge conduit 62A, the outer end of which communicates with a channel 62B formed in the end face 20A of the housing 20.

In the face of plate 60A is provided a circular seat for the outer internally toothed member 63 of a fluid pump and keyed to shaft 21 is the inner externally toothed member 63A, these two constituting a well known type of fluid pump. Over the seat for the pump members 63 and 63A is a suitable cover plate 64 provided with a packing ring 64A. The entire pump assembly is as shown supported by the shaft 21 and upon a suitable antifriction bearing 64C, the inner race of which is shown as a hardened ring 64D mounted on the shaft. This latter however may be eliminated if desired by local hardening of the shaft itself.

The pump assembly comprising plate 60A, pump members 63 and 63A, and cover 64 is rotatably carried on shaft 21 and in a suitable flanged ring 65 bolted to the inside of the housing part 20A. The ring 65 is, however, somewhat larger than the plate 60A and where the part 64 projects through wall 20A there is provided a small clearance 66, so that the pump assembly floats on shaft 21 and may move a short distance in any lateral direction. And since there can be such relative movement between the pump 60 and wall 20A, suitable packings 64B will be used at the ends of conduits 62A and 60D.

The conduits 61 and 62B, together with conduits 67 and 67A, are formed as channels in the outer face of wall 20A and covered by suitable plates 67B. At their upper ends, the conduits 62B, 67 and 67A are open to passages bored in the upper thickened wall of housing 20 and passages 62B the pump discharge passage connected to one side of a cooling device 68 (see Fig. 12) from which the fluid is led to combined relief and control valve indicated as a whole by numeral 70.

Figure 4:
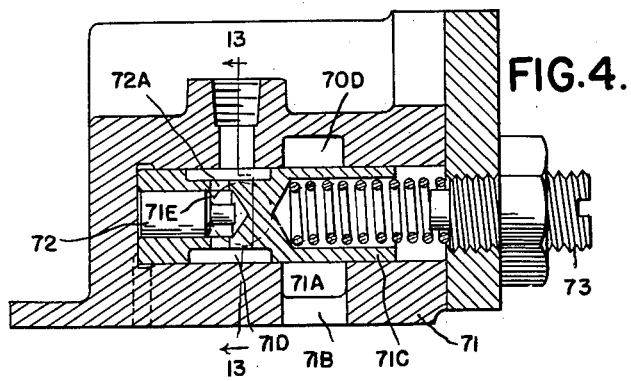
Fig. 4 is a section on line 4—4 of Fig. 1.
Figure 7:
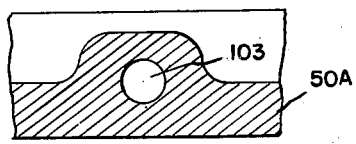
Fig. 7 is a sectional view taken on line 7—7 of Fig. 1.

This valve unit 70 as indicated includes the pressure control and relief portion 71 and the control portion 75, the former being shown more in detail in Figs. 3 and 4. In these figures, the relief valve is shown as provided with a cylindrical bore having an annular chamber 71A provided with an outlet 71B. Slidable in the bore is a spring pressed plunger 71C having an annular groove or channel 71D into which leads the inlet 71E.

In the position of Fig. 4 the "idle" or no pressure position, the groove 71D is out of registry with chamber 71D but, when sufficient oil pressure is supplied to compress the spring in plunger 71C, the groove moves to partial registry and allows the oil to escape from outlet 71B. In order to provide for such movement, the "rear" end of the plunger 71C is bored axially and in the bore is a small slidable plug 72 of such length as to leave a small chamber in the bore opposite groove 71D and suitable openings 72A provide communication between the chamber and groove.

Adjustment of the spring tension for plungers 71C may be accomplished by means of the screw plug 73. The opening 73A provides means for applying a suitable pressure gauge indicated at 73B in Fig. 12.

The control valve 75 is shown in detail in Figs. 2 and 3, and consists of a body provided with a suitable bore 75A within which is a rotatable valve member 75B having an annular groove 75C.

Opening to groove 75C is a pair of dead end passages 76 and 76A each extending axially a sufficient distance to open communication between groove 75C and one of the three outlets 77, 77A and 77B. These passages 76 and 76A are relatively short peripherally and between them the valve member is provided with peripherally extending partial grooves or chambers 78 of sufficient length to extend over two or more of the outlets 77, 77A and 77B.

In operation, the pump 60 discharges its fluid through inlet 79 of the control valve 75 and from chamber 75C this fluid flows through either one or more of the outlets 77, 77A and 77B or through outlet 79A to valve 71. In the "neutral" position of valve 75, determined by the position of handle 80 fixed to valve member 75B, one of the chambers 78 registers with the three outlets 77, 77A, 77B so that all fluid entering valve 75 goes to valve 71.

Movement of the handle 80 to "forward" position, moves passage 76A to registry with outlet 77A and the chamber 78 to registry with outlets 77 and 77B, thereby establishing a fluid pressure connection with clutch 30—30A through outlet 77A, conduit 67, to a peripheral groove 102 in the outer surface of the tubular insert 101D in shaft 21. Also opening to groove 102 is a conduit 103 leading through the web of disc 50A to clutch cylinder 51.

When the handle 80 is moved to "reverse" position, the passage 76 registers with outlet 77B and chamber 78 connects outlets 77 and 77A. Through outlet 77B the fluid pressure flows through conduit 103, formed in ring member 40B, to the cylinder 41 for clutch 31—31A and at the same time allows oil pressure from clutch 30—30A to flow out of outlet 77 and back to the transmission housing.

These clutch operations are indicated in Figs. 9, 10 and 11.

Lubrication of the transmission is accomplished by the return of oil from the valve 70 through the conduit 67A. This leads to the annular groove 100 in the outer periphery of shaft 21 and then through suitable radial passages to the inner end of an axial bore 101 in the shaft.

In the bore 101 is a tubular insert 101D, the passage 101A of which leads to the inner end of the shaft and is opposite a short axial bore 101B in the opposed end of shaft 22. Near the end of the insert and also communicating with bore 101B are radial passages 101C leading from the passage 101A to the outside of the reduced ends of the two shafts so that oil will flow out into and lubricate the differential gears. Oil may also flow out between the adjacent shaft ends to lubricate the spider bearing.

One of the features of the present transmission is the form of annular pressure cylinder for actuating the clutches 30 and 31. These cylinders and their pistons are so formed they can not stick or jam if for any reason the piston in its movement does not maintain its parallelism. This is accomplished by machining the outer wall 41A of the cylinder to true cylindrical shape and the inner wall 41B curved axially of the cylinder on an arc the center of curvature of which is located substantially at the center point of that part of the cylinder diametrically across the annulus. In machining the piston 42, the inner peripheral wall 42A is formed as a cylinder while the outer wall 42B is curved on an arc whose center point is substantially coincident with the center of curvature of cylinder wall 41B. Further, in each of these curved walls is provided a flat bottom annular groove for the reception of a packing ring of circular cross section of resilient rubber like material commonly called an O-ring.

Figure 8:
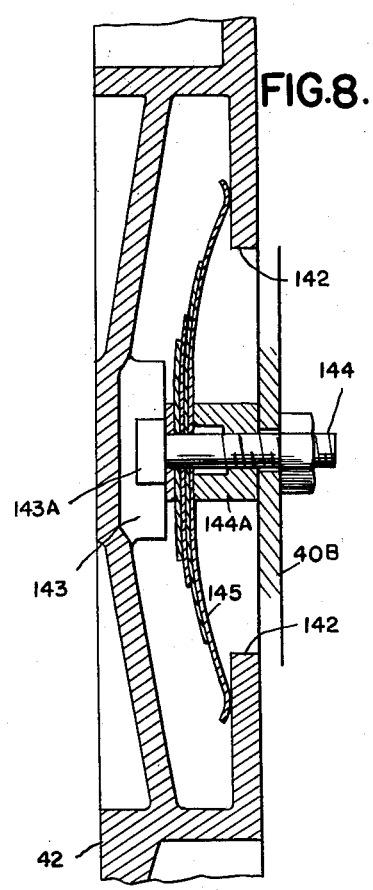
Fig. 8 is a part sectional view of one of the pistons taken substantially on line 8—8 of Fig. 9.
Figure 13:
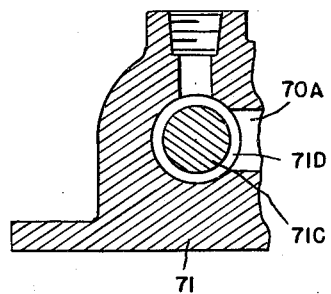
Fig. 13 is a section on line 13—13 of Fig. 4.
Figure 6:
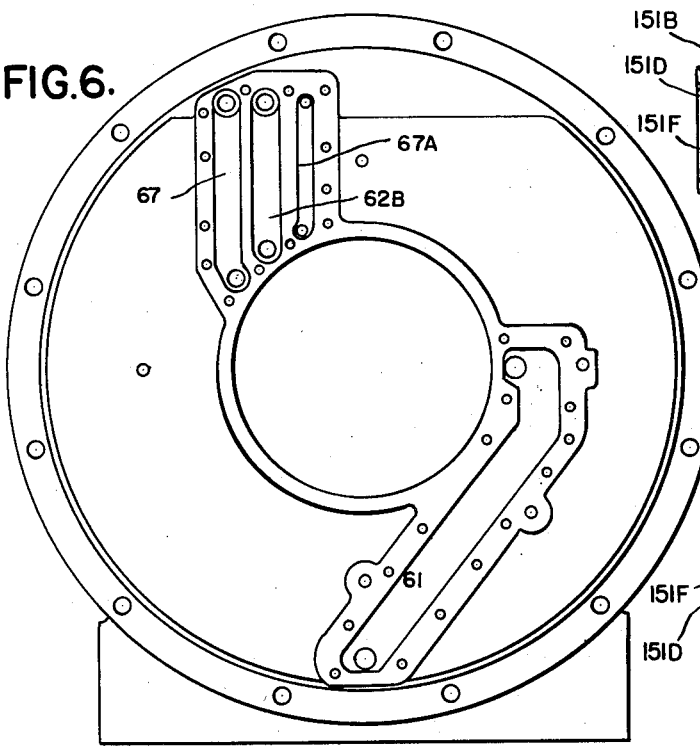
Fig. 6 is a sectional view on line 6—6 of Fig. 1.

The pistons 42 and 51A are, as stated, annular and for the most part channeled for weight reduction, the rear face being continuous except for a plurality of recesses such as that indicated in Fig. 8. These recesses, as shown in this figure, extend peripherally of the ring for a substantial distance and are provided with overhanging edges 142 and with a boss 145 opposite the opening into the recess, the boss having its outer face recessed to receive the head of bolt 144.

Fixed in ring 40B is a removable stud consisting of a suitable bolt 144 and spacer or sleeve 144A which stud has mounted upon it a laminated spring 145 spanning the opening between edges 142 and acting against the inner faces of such edge portions. This spring 145 serves as a return spring when the pressure in the cylinder has been released.

While the springs 145 will serve to expel the fluid and release the clutches, a quicker action of the release is obtained through the use of bleeder valves 150 mounted adjacent the periphery of the cylinders 41 and 51, two or more of such valves being used on cylinder 51 in order not to unbalance this rotating part.

Figure 15:
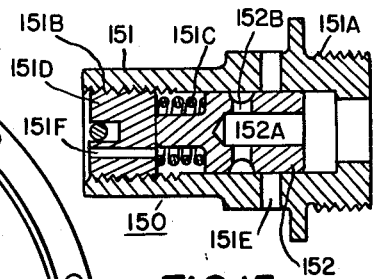
Figs. 14 and 15 are central longitudinal sectional views of the clutch bleed valve, showing the valve in two positions.
Figure 14:
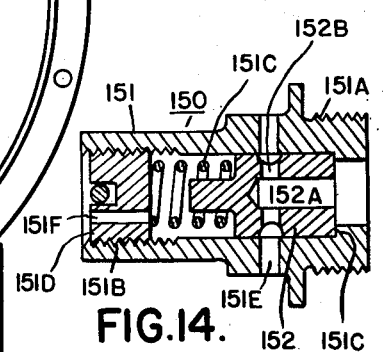

The valves 150, as shown in Figs. 14 and 15, consist of a tubular element 151 externally threaded at one end 151A and internally threaded at the other 151B.

Adjacent the end 151A the bore of the element 151 is provided with a shoulder 151C serving to limit the movement of a slidable value plunger 152, this latter being resiliently thrust toward the shoulder by a spring 151C reacting against a suitable adjusting screw plug 151D.

As shown, the plunger 152 is axially bored as at 152A from its free end to near the other end and is provided with a radial passage 152B opening to the bore adjacent its closed end while the element 151 is also provided with radial passages 151E adapted to register with passages 152B when the valve 152 is against the shoulder 151C. Free movement of the valve 152 is allowed by providing a passage 151F in the adjusting plug 151D.

In the operation of the clutches by supplying fluid under pressure to cylinders 41 and 51, the valves 152 will be moved inwardly of their housings 151 to the position of Fig. 15 and thereby move the passages 152B and 151E out of registry to close the valves and maintain them closed so long as the clutch actuating pressure is maintained. As soon, however, as this relatively high pressure is released, the springs 151C immediately move the valves 152 to the position of Fig. 14 wherein the passages 151E and 152B are in registry, thus allowing the springs 145 and centrifugal force (in the case of cylinder 51) to evacuate the cylinders and release the clutches.

Piston 51A will be identical with piston 42 but of course the spring carrying studs will be fixed to disc 50A. The spring carrying studs in conjunction with the bosses 143 serve also to prevent rotation of the pistons relative to their respective cylinders.

The operation of the transmission seems obvious in view of the foregoing and will not be described in detail other than to state that with the control valve in the central position of Fig. 10 oil from the pump will pass through the valve and spill back into the housing.

If it is desired to drive the shaft 22 and propeller shaft in a "forward" direction, the valve is moved to the position of Fig. 9 and thereby oil under pressure is supplied to the left hand (Fig. 1) clutch 30 to lock the spider 24 to shaft 21 and produce a direct drive.

If it is desired to drive the shaft 22 in "reverse," the valve is moved to the position of Fig. 11 and thus oil delivered to clutch 31 to lock the spider 24 against rotation and simultaneously release clutch 30.

I claim:

1. In a transmission, a hydraulically operable motor, comprising an annular cylinder and annular piston, said annular cylinder having a cylindrical outer perimetral wall and a convexly curved inner perimetric wall, said annular piston having a cylindrical inner perimetral wall and a convexly curved outer perimetric wall, and packing material carried by the curved walls of said cylinder and piston.

2. In a transmission, a hydraulically operable motor, comprising an annular cylinder and annular piston, said annular cylinder having a cylindrical outer perimetral wall and a convexly curved inner perimetric wall, the center of curvature being at substantially the center point of that portion of the annulus diametrically opposite said curved wall, said annular piston having a cylindrical inner perimetral wall and a convexly curved outer perimetric wall the center of curvature being at substantially the center point of that portion of the annulus diametrically opposite said curved wall, and packing material carried by the curved walls of said cylinder and piston.

3. In an annular cylinder and piston combination, an annular cylinder and an annular piston therein axially of the annulus, said cylinder having its inner perimetral wall curved endwise and said piston having its outer perimetral wall curved also endwise.

JOHN D. MOONEY.

References Cited in the file of this patent

UNITED STATES PATENTS

| Number | Name | Date |
|---|---|---|
| 942,065 | Grebel | Dec. 7, 1909 |
| 1,806,669 | Campbell | May 26, 1931 |
| 2,142,529 | Smith | Jan. 3, 1939 |
| 2,247,201 | Loos | June 24, 1941 |
| 2,291,241 | Lawrence | July 28, 1942 |
| 2,307,067 | Paulus | Jan. 5, 1943 |
| 2,356,899 | Stutter | Aug. 29, 1944 |
| 2,363,605 | McLintock | Nov. 28, 1944 |
| 2,368,412 | Cords | Jan. 30, 1945 |
| 2,440,589 | Kegresse | Apr. 27, 1948 |
| 2,604,074 | Trevaskis | July 22, 1952 |

FOREIGN PATENTS

| Number | Country | Date |
|---|---|---|
| 529,885 | Great Britain | Nov. 29, 1940 |